United States Patent [19]

Layer et al.

[11] Patent Number: 5,631,823
[45] Date of Patent: May 20, 1997

[54] METHOD OF MAKING A CONNECTION, PARTICULARY A SCREW CONNECTION

[75] Inventors: August Layer, Oehringen; Yinzenz Haerle, Neckartenzlingen; Wolfgang Backe; Egbert Schneider, both of Aachen, all of Germany

[73] Assignee: Robert Bosch GmbH, Stuttgart, Germany

[21] Appl. No.: 289,761

[22] Filed: Aug. 12, 1994

[30] Foreign Application Priority Data

Sep. 9, 1993 [DE] Germany ............. 43 30 481.8

[51] Int. Cl.⁶ .................................................. G06F 19/00
[52] U.S. Cl. .................. 364/148; 73/862.23; 173/176; 364/508; 395/61; 395/900
[58] Field of Search ............................. 364/148, 508, 364/505, 506, 507, 550, 551.01, 474.02; 81/467, 469; 173/176; 73/862.23, 862.24, 761; 395/61, 900

[56] References Cited

U.S. PATENT DOCUMENTS

| | | | |
|---|---|---|---|
| 4,110,829 | 8/1978 | Boys | 364/508 X |
| 4,375,121 | 3/1983 | Sigmuno | 364/508 X |
| 4,685,050 | 8/1987 | Polzer et al. | 364/508 X |
| 4,894,767 | 1/1990 | Doniwa | 364/153 |
| 5,012,430 | 4/1991 | Sakurai | 395/903 X |
| 5,047,701 | 9/1991 | Takarada et al. | 318/568.1 |

FOREIGN PATENT DOCUMENTS

| | | |
|---|---|---|
| 0171058 | 12/1986 | European Pat. Off. |
| 0266066 | 4/1988 | European Pat. Off. |
| 0285815 | 12/1988 | European Pat. Off. |
| 3216773 | 11/1983 | Germany |
| 3837942 | 10/1990 | Germany |
| 4200693 | 5/1993 | Germany |
| 4241941 | 8/1993 | Germany |
| 64126594 | 12/1990 | Japan |

OTHER PUBLICATIONS

O+P Olhydraulik und Pneumatik 35, vol. 5, May 1991, pp. 429–436.
Fuzzy in der Praxis (Fuzzy in Practice), Elektronik 20, 1991, pp. 63 to 75.
Williams–"Fuzzy Logic Simplifies Complex Control Problems"–Computer Design, Mar. 1, 1991–pp. 90–102.

*Primary Examiner*—Joseph Ruggiero
*Attorney, Agent, or Firm*—Michael J. Striker

[57] ABSTRACT

The method of making a screw connection includes measuring a torque applied to the screw by a controllable screw driver device and measuring a rotation angle of the screw in individual connection steps during the making of the connection to obtain measured values of the torque and rotation angle; calculating a change in torque over a predetermined rotation angle interval from the measured values and deriving a stiffness parameter from the change in torque divided by the rotation angle interval; calculating a change in rotation angle over a predetermined time interval from measured values of the rotation angle and predetermined time interval and deriving a rotation speed as the rotation angle change divided by the predetermined time interval; analyzing the stiffness parameter and the rotation speed by a fuzzy-logic device to obtain controlling output variables and operating the fuzzy-logic device in one of three operating modes to obtain the controlling output variables and to produce at least one adjusting parameter for the controllable screw driver device to accurately make the connection. The three operating modes of the fuzzy-logic device consist of three association or correlation functions for either a low stiffness mode, a normal stiffness mode and a high stiffness mode of operation or a low rotation speed mode, a normal rotation speed mode and a high rotation speed mode.

10 Claims, 3 Drawing Sheets

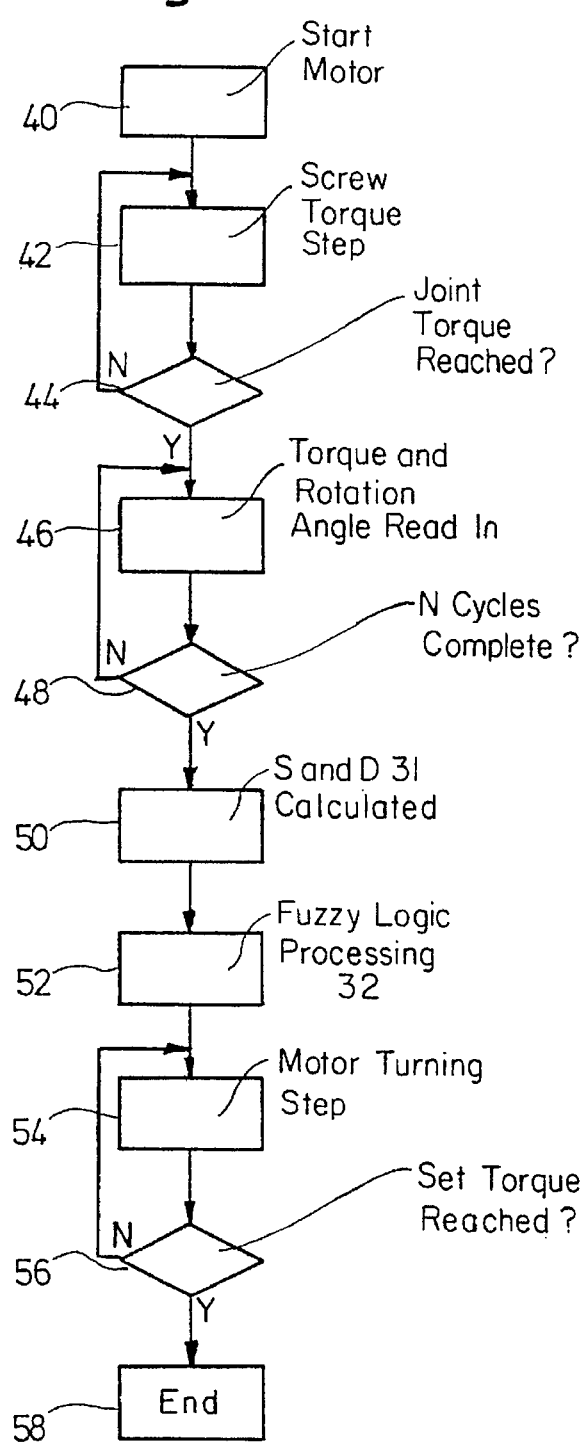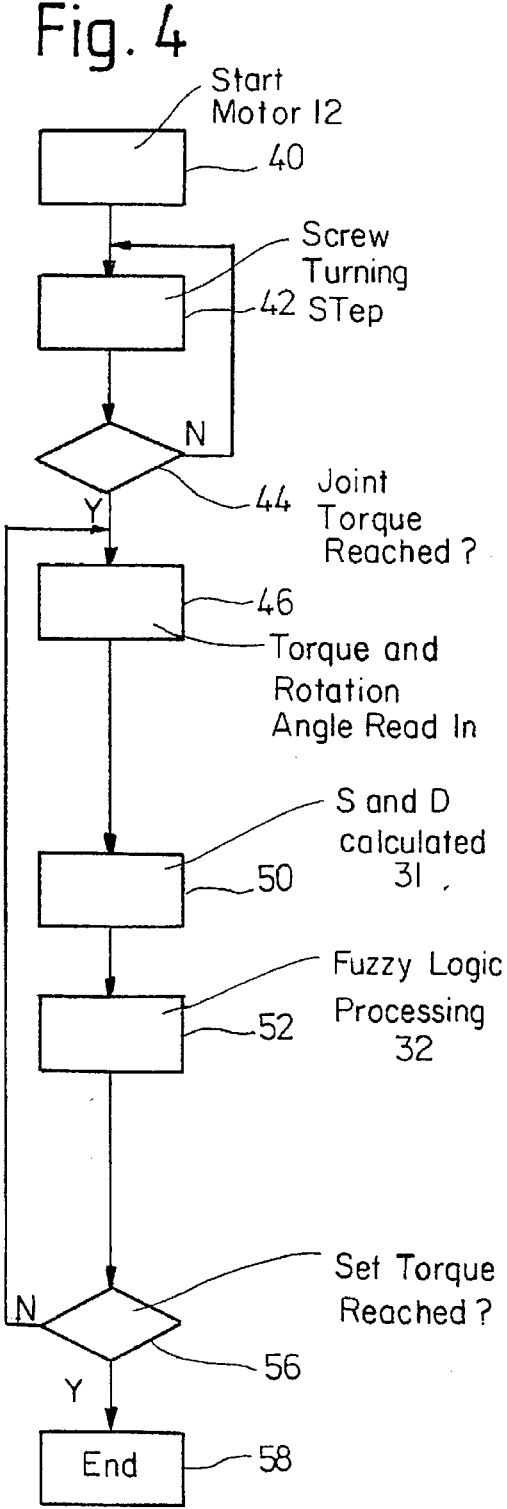

METHOD OF MAKING A CONNECTION, PARTICULARY A SCREW CONNECTION

BACKGROUND OF THE INVENTION

The present invention relates to a connection and, more particularly, to a screw connection between at least two parts made by a connection device.

To releasably attach at least two parts together by a screw connection is well known. If a high-quality screw connection is to be made, it is necessary to perform it in a controlled manner, which means that a predetermined desired state or configuration is reached after the screw turning process is finished. This state or configuration can be characterized by a particular parameter such as torque, rotation angle, rate of change of the torque at a particular rotation angle, tension, depth and so forth. In order to best obtain a resulting connection with optimum accuracy, controlled processes are used, in which the optimum controlling parameter is determined by experiment and must be predetermined. Since the controlling parameter must be set according to the various attachment situations, extensive preliminary experiments are performed in various connection situations, including various series of measurements. It is disadvantageous that troublesome variations occurring during an individual connection event, which can differ for individual screw connections despite the fact that the connection situation is basically the same, are not accounted for in the standard methods of making such connections.

SUMMARY OF THE INVENTION

It is an object of the present invention to provide an improved method of making a connection, particularly a screw connection, which does not have the above-described disadvantage.

According to the invention the method of making a connection, especially a screw connection, with a controllable connection device, comprises the steps of measuring at least two real parameters characteristic of at least one individual connection step during the connection process to obtain measured values, analyzing the measured values characteristic of the connection step with a fuzzy-logic means to obtain controlling output variables and generating at least one adjusting parameter from the controlling output variables to control the connection device to accurately make the connection.

The process according to the invention has the advantage that during each of a plurality of connection processes an adjustment of the controlling output variables occurs automatically, and particularly suddenly, so that different troublesome variations in the individual connection processes can be considered and accounted for during each individual connection process. Thus each individual connection event, each tightening of a screw for example, can be made with the ccontrollable connection device so that the same value of the characterizing output variables results at the end of the connection process so that the connection process is accurate and repeatable. For example, a number of screw connections can be made, which advantageously all have the same tightening torque. Because at least two actual measured parameters characterizing the connection measured during the connection process are analyzed by fuzzy-logic principles, many boundary conditions called for by the troublesome variations can be considered, but without that the expense for making the connection process in an accurate manner as described above is substantially higher.

In a preferred embodiment of the method, the measured values of the characterizing parameters are measured until at least one of the measured values has reached a set or desired value. Because of that it is particularly advantageously possible that the controlling output variables from which an adjusting parameter can be derived for the connection process actually can be analyzed until the set value is reached so that troublesome variations occurring shortly prior to completion of the connection process can be considered or taken into account. Thus a very accurate connection can be made, since an adjustment of the controlling parameter can take place continuously.

In a further preferred embodiment of the method the measured values of the characterizing parameters are measured until a predetermined connection configuration or state is reached and at that time a controlling adjusting parameter for the connection is generated which allows the set or desired value to be obtained. Because of that, the advantage that the actual measured values are measured, advantageously cyclically, at a previously accurately determinable time point and thus a very exact determination of the necessary adjusting parameter is possible, which guarantees the achievement of the desired set value.

Further advantageous embodiments are set forth in the dependent claims appended hereinbelow.

BRIEF DESCRIPTION OF THE DRAWING

The objects, features and advantages of the present invention will now be illustrated in more detail by the following detailed description, reference being made to the accompanying drawing in which:

FIG. 3 is a flow chart of a first embodiment of a process for making a connection according to the invention;

FIG. 4 is a flow chart of a second embodiment of a process for making a connection according to the invention;

DESCRIPTION OF THE PREFERRED EMBODIMENTS

Figure 1:
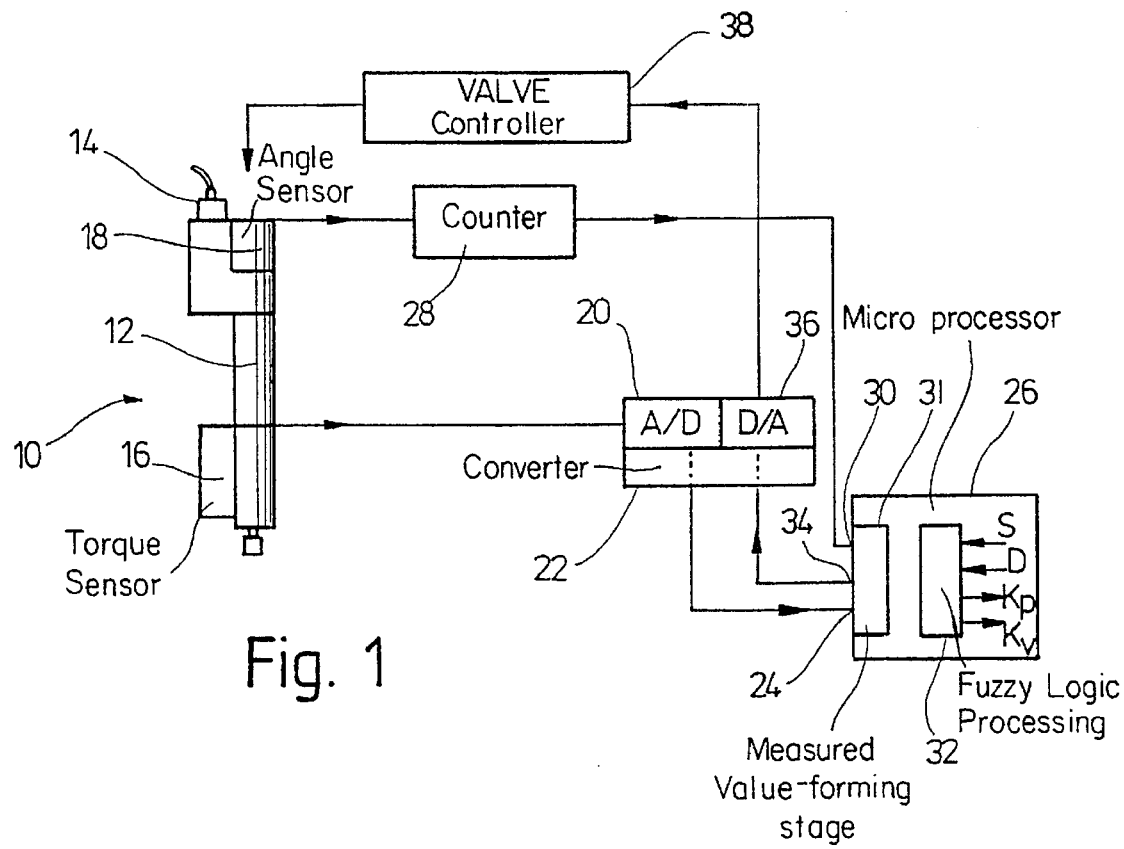
FIG. 1 is a block diagram of a controllable servopneumatic screw driver device which performs a method of connection, namely by turning a screw, according to the invention.

FIG. 1 shows a servopneumatic screw driver device 10, which comprises a pressurized air motor 12 which is used for a drive to turn an unshown screw. The performance or power output of the pressurized air motor 12 is controllable by a servovalve 14. The screw driver device 10 has a torque sensor 16 for measurement of the torque and a rotation angle sensor 18 for measurement of a rotation angle. The servovalve 14 is connected to a suitable air pressure source. The torque sensor 16 is connected to an analog-to-digital converter means (A/D) 20 of a converter 22, The means 20 for analog-to-digital conversion is connected to a first terminal 24 of a microprocessor 26. The measured values of torque determined by the torque sensor 16 in an analog manner are thus digitized and thus fed to the microprocessor 26 for analysis.

The rotation angle sensor 18 is advantageously an incremental position transmitter and is connected to a counter 28. The counter 28 produces a count value according to an angular position and sends a suitable resulting signal to a second input terminal 30 of the microprocessor 26. The microprocessor 26 includes a measured value-forming stage 31, in which a change of the torque over a rotation angle interval and a change of the rotation angle over a time interval are measured and the stiffness S equal to the change in torque divided by the rotational angle interval and the rotation speed D equal to the rotation angle change over the time interval are calculated from the respective measured values supplied by the rotation angle sensor 18 and the torque sensor 16. The respective values thus determined for the stiffness S and the rotational speed D are fed to a fuzzy-logic means 32 as input variables. The fuzzy-logic means 32 produces as controlling output variables the respective control parameters $K_p$ and $K_v$, which are then fed from an output terminal 34 of the microprocessor 26 to a digital-to-analog converter means (D/A) 36 of the converter 22. The D/A converter means 36 is connected with a valve controller 38, which produces an adjusting parameter for the servovalve 14. The fuzzy-logic means 32 receives thus the available input variables derived from the actual measured values obtained from the sensors 16 and 18 and produces the controlling output variables for controlling the valve controller 38. The valve controller 38 again controls the power output and the rotational speed of the pressurized air motor 12 via the servovalve 14.

Figure 2:
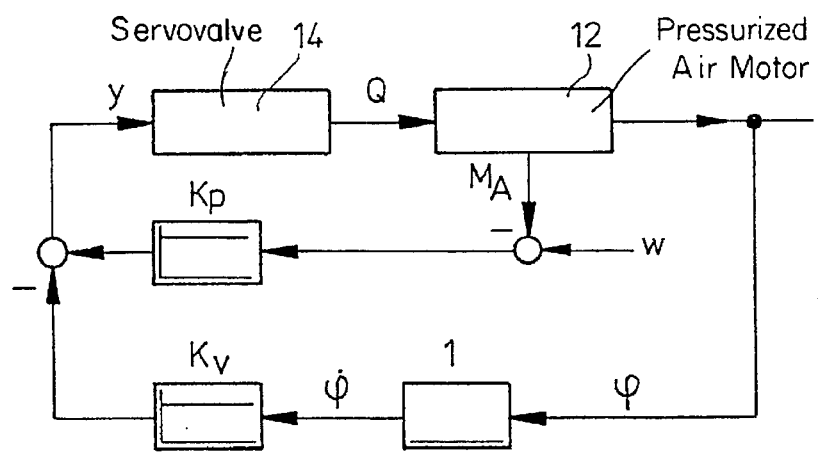
FIG. 2 is a block diagram showing the basic method of process control for the screw driver device shown in FIG. 1.

In the block diagram in FIG. 2 a method of controlling the torque applied by the screw driver device 10 shown in FIG. 1 is illustrated. An actual measured value MA is supplied by the sensor 16 as a controlling parameter and compared with a set value W to be reached. A controlling output variable $K_p$ proportional to the difference between the actual value MA and the set value is obtained. The rotation angle ϕ determined by the sensor 18 is differentiated and the differentiated rotation angle ϕ' determines the controlling output variable $K_v$. The controlling output variables $K_p$ and $K_v$ are compared with each other and an adjusting parameter z for the servovalve is derived from them. This again controls a flow of air Q, with which the pressurized air motor 12 is driven. The feedback control loop shown here in FIG. 2 should serve to help understand the subsequently described fuzzy-logic control by means of the fuzzy-logic means 32 mentioned in FIG. 1.

A first embodiment of the method for making a screw connection according to the invention is shown in FIG. 3. In a first process step 40 the pressurized air motor 12 is turned on. In a second process step 42 an unshown screw is tightened or turned further, In the third step 44, a decision step, whether the joint torque has been reached is tested. The joint torque is the torque obtained when a screw head of the screw contacts on one of the parts to be connected. If this joint torque is not reached, the system returns to the second process step 42, in which a screw turning or tightening operation occurs. If instead the joint torque is reached, in the next process step 46 the torque and rotation angle are read in via the already mentioned sensors 16 and 18. In a following or fourth process step 48, a decision step, whether a predetermined number N of measurement cycles have occurred is determined. If this is not the case the system returns to process step 46 so that the torque and rotation angle can be read in again. If the desired number of machine cycles N have occurred, the desired stiffness S and rotation speed D are calculated. The stiffness S is derived from the change of the torque over a rotation angle interval and the rotational speed D is derived as the change of the rotation angle over the associated time interval. In an additional process step 52 the values of S and D obtained from the measured parameters are processed and/or are input as input variables to the fuzzy-logic circuit means 32 and processed by the fuzzy-logic circuit means 32 which produces the controlling output variables $K_p$ and/or $K_v$ necessary for the process of controlling the valve controller 38. In the next process step 54 the servovalve 14 is controlled by the valve controller 38 so that a controlled operation of the pressurized air motor 12 occurs. In a following process step 56, a decision step, the desired tightening torque on the screw is compared with a predetermined set value. If the set value is not achieved, then additional tightening or screwing occurs in the process step 54. If in contrast the set value of the torque is attained, then the screwing process is ended in the last process step 58.

A fuzzy-adaption for the controlled servopneumatic screw driver device 10 is achieved by the process shown in FIG. 3. The actual torque and the actual rotation angle are measured at a predetermined time point, here at the time when a positive or "yes" answer is obtained in process step 44, and input variables are derived from the measured values for the fuzzy-logic means 32 in the measured value-forming stage of the microprocessor. The fuzzy-logic means 32 processes the input variables with a data base and produces the controlling output variables $K_p$ and $K_v$ required for the subsequent controlling process. These controlling output variables are used to prepare the adjusting parameter with which the servovalve 14 and thus the pressurized air motor 12 are controlled. Thus the controlling output variables are automatically set according to the achieved joint torque so that for individual cases in which the hardness of the connection varies an exactly controlled operation of the pressurized air motor 12 is possible for the controlled tightening or screw turning process performed in process step 54. Since this adjustment occurs automatically during the connection or screwing process, an erroneous adjustment is prevented by a user of the servopneumatic screw driver 10.

An additional embodiment of a screw securing or tightening process according to the invention using the principles of fuzzy-logic is illustrated in FIG. 4. The process steps which are the same as in FIG. 3 are provided with the same reference numbers and are not described in further detail. In this embodiment the process step 48 of FIG. 3 has been skipped or omitted so that the calculation of the stiffness S and the rotation speed D is performed independently of a predetermined number of measurement cycles. In process step 52 the fuzzy-logic processing in fuzzy-logic circuit means 32 occurs to produce the controlling output variables. The fuzzy logic processing continues until the question "Has the set value torque been achieved?" is answered positively in process step 36 at which point the process is finished. If on the other hand the answer to this question is in the negative, then control is returned to process step 46 so that actual measured values for the torque and the rotation angle are again read into the microprocessor and evaluated. A control of the screw tightening or securing process is attained here by the above-described method according to the invention by which troublesome variations of the actually occurring connecting or joint torque from the desired or set value. A control of the tightening or screwing process occurs thus until the desired set value is obtained. Furthermore this embodiment is particularly desirable, because the time-consuming decision step 48 of the method of FIG. 3 is omitted so that a very rapidly operating screw driver device 10 using fuzzy-logic principles results in which for example the difference between the input of the measured joint torque and the set value amounts to less than a microsecond. An additional substantial advantage of the method described in FIG. 4 is that the consideration and avoidance of system affecting troublesome variations is possible, since the automatic control results in the attainment of the set value when the method is operative.

The control described up to now in FIGS. 1 to 4 is based essentially on the analysis of input variables to obtain controlling output variables. In the embodiments of the method described here the stiffness S and the rotation speed D are calculated from the measured torque and the measured rotation angle by the fuzzy-logic means 32.

Figure 5A:
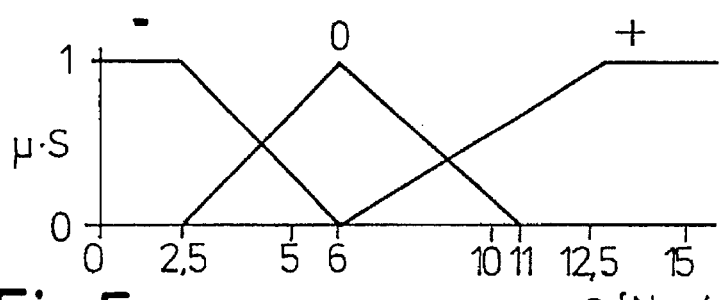
FIG. 5 includes two separate graphical illustrations of families of functions of input variables derived from measured parameters characteristic of the connection process according to the invention.
Figure 5B:
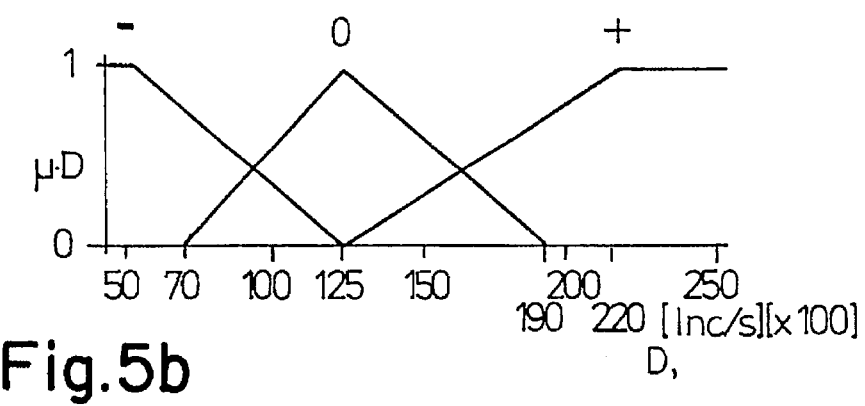

The so-called family of associating functions of these input variables are shown in FIG. 5, the stiffness values S being set forth in the upper graphical illustration in FIG. 5 with the respective associating values of the associating functions. The associating functions are categorized in FIG. 5, as namely the "low stiffness" class (indicated with–in the drawing), "normal stiffness" class (indicated with—0—in the drawing) and "high stiffness" class (indicated with—+—in the drawing). The values of the associating function continuously vary between the value 0 and the value 1. The value "0" means "no associativity" and the value "1" means "100% associativity".

The classes are divided here so that in first class of association functions of "low stiffness" the associativity is 1 for all values under 250 Nm/rad. The associativity of this class drops then from 1 at 250 Nm/rad as the stiffness falls to a value of 0 at 600 Nm/rad. The second class of functions of "normal stiffness" the associativity increases from a value of 0 at a stiffness of 250 Nm/rad to the value 1 at a stiffness of 600 Nm/rad. The associativity drops then from the value 1 at the stiffness of 600 Nm/rad to a value of 0 at a stiffness of 1100 Nm/rad.

The third class of association functions has an increasing associativity from a stiffness of 600 Nm/rad to 1250 Nm/rad. The associativity reaches a value of 1 for all stiffness values above 1250 Nm/rad.

The lower second graphical illustration in FIG. 5 includes a family of association functions for the second input variable, namely the rotation speed. These are represented here as uD. The associativity is again shown for different classes, namely for a "low rotation speed" (indicated with"–"), for the class "normal rotation speed" (indicated with "0") and for the class "high rotation speed" ( indicated with "+" in FIG. 5). The associativity is also here given by values between 1 and 0. The classes are divided here also so that the first class "low rotation speed" takes a value of 1 for all values of rotation speed D under 5000 Inc/s. The associativity of this class drops then from the value 1 at D=5000 inc/s to a value of 0 at D=125000 Inc/s.

The second class "normal rotation speed" has a climbing associativity value of 0 from rotation speeds of 7000 Inc/s to the value of 1 at D=12500 Inc/s. The associativity value then drops from 1 again to a value of 0 at a rotation speed of 19000 Inc/s.

The third class "high rotation speed" has an increasing associativity value from rotation speed D=125000 Inc/s to 22000 Inc/s. The associativity values is 1 at all rotation speeds above 22000 Inc/s.

The above-named numerical associativity values for the transition regions between the individual classes in the input variables are only exemplary and their values can be changed for the individual screw connection cases.

Figure 6A:
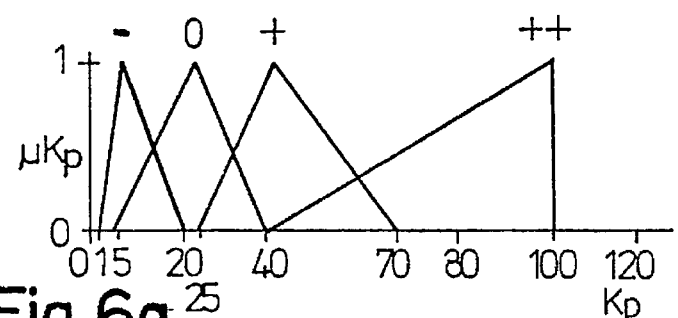
FIG. 6 includes two separate graphical illustrations of the functional behavior of functions of output variables from the fuzzy-logic means for control of the connection process according to the invention.
Figure 6B:
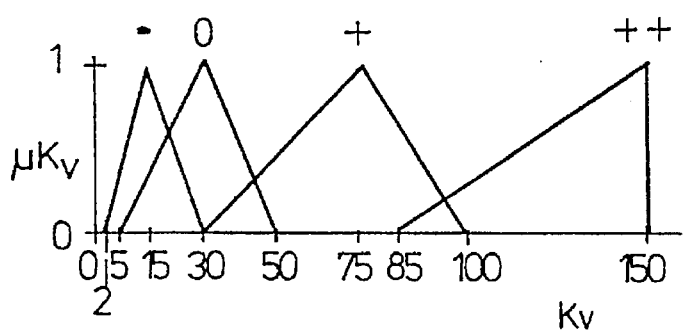

The family of associating functions of the output variables of the fuzzy-logic means 32 are now illustrated in FIG. 6. In the upper graphical illustration in FIG. 6 the values of the controlling output variables $K_p$ which are utilized for control of the valve controller 38 and which are obtained from the stiffness and the rotation speed derived respectively from the torque and the rotation angle.

The controlling output parameter is separated into four classes, which are associated with individual absolute values. The associativity values of the controlling output parameters $K_p$ in the individual classes occurs thus by the processing of the Fuzzy set of the input variables shown in the upper illustation in FIG. 5 in accordance with the stored data base with the fuzzy-logic circuit means 32. The classes "low", "normal" and "high" and "very high" can be distinguished. The associativity of the class "low" (indicated with "–") climbs from a value 0 to 1 between output variable values 1 and 5 and then decreases to the value 0 between output variable values 5 and 20. The associativity of the class "normal "(indicated with 0) increase from the associativity value 0 at output variable value 5 to the associativity value 1 at output variable value 20 and drops to the associativity value 0 at output variable value 40. The associativity values for the class "high" (indicated with +) increase from associativity value 0 to 1 between output variable values 25 and 40 and drops to the associativity value 0 from the output variable values 40 to 70. The associativity of the classes "very high" (indicated with ++) increases from the associativity value 0 at the output variable value 40 to the associativity value 1 at the output variable value 100 and falls suddenly to 0 there. In the second lower graphical illustration in FIG. 6 the associativity function of the second output variable, the controlling output variable $K_v$ are shown. The associativity functions are again divided into four classes, which yield a certain predetermined absolute value of the controlling output variable $K_v$. The associativity values for the class "low" (indicated with "–") increases to an associativity value of 1 at output parameter value 15 from a value of 0 at an output parameter value 2 and drops to the associativity value 0 at output parameter value 30. The class "normal"(indicated with a 0) increases from an associativity value of 0 at a parameter value of 5 to an associativity value 1 at an output parameter value 30 and then drops back again to an associativity value 0 at an output parameter value 50. The associativity function for the class "high"(indicated with +) increases from the associativity value of 0 at output parameter value 30 to an associativity value of 1 at the output parameter 75 and drops again to the value 0 at an output parameter of 100. The associativity function of the classes "very high "(Indicated with ++) increases from an associativity value of 0 at the output parameter value of 85 to the value 1 at the output parameter value 150 and then suddenly drops at that output parameter value to 0.

The families of association functions illustrated with the aid of FIGS. 5 and 6 are used finally to produce the adjusting parameter z, with which the servovalve 14 and thus the power of the pressurized air motor 12 is controlled, by the measurement value-dependent processing of the controlling output variables by the fuzzy-logic means 32. Thus this family of association functions constitutes a description of the fuzzy-logic circuit means 32 operating principles.

The Controlling Laws or Principles are discernable from the following Table I, from which the controlling output variables $K_p$ and/or $K_v$ may be read off for the different measured values at the screw driver device 10.

TABLE I

| Principles for Deriving the Adjusting Parameter Z | | | |
|---|---|---|---|
| Rotation Speed D | Stiffness S | Output Variable $K_p$ | Output Variable $K_v$ |
| + | − | ++ | ++ |
| − | − | + | − |
| 0 | 0 | 0 | 0 |
| − | 0 | − | 0 |
| + | + | − | − |
| 0 | + | 0 | + |

If one uses the first line in Table I of the Controlling Law, the controlling output variables $K_p$ and $K_v$ are "very high" when the rotation speed D is large and the stiffness S is small.

The other possible situations are to be taken from the other lines of the Controlling Law in Table I.

The torque and rotation speed are described as values to be measured in the embodiments shown here. It is of course understandably possible also to use other actual measured values characteristic of the process step in the connecting or joining process and these also can be fed to the fuzzy-logic circuit means for analysis to determine an adjusting parameter z. These other measured values can be the tension or the depth. Also the connection can be made by controlling more than two measured values with the fuzzy logic circuit means so that an exact adjustment of the set value is possible, since by the determination of several families of functions of the input variables an exact association with the output variables is possible by the families of functions.

While the invention has been illustrated and described as embodied in a method of making a connection, especially a screw connection, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Method of making a connection by means of a controllable connection device, said method comprising the steps of:
   a) measuring at least two real parameters characteristic of at least one individual connection step during the making of the connection with the connection device to obtain measured values of said at least two real parameters;
   b) providing fuzzy-logic means for obtaining controlling output variables from said measured values, said fuzzy-logic means containing at least three association functions for correlation of said measured values with said controlling output variables, said at least three association functions corresponding to at least three operating modes graded according a magnitude of said measured values; and
   c) analyzing the measured values characteristic of the at least one individual connection step by said fuzzy-logic means using one of said at least three association functions to obtain the controlling output variables and generating at least one adjusting parameter for the connection device from the controlling output variables so as to control the connection device to accurately make the connection.

2. Method as defined in claim 1 wherein the measuring of the real parameters continues during a plurality of successive ones of the individual connection steps until a set value of at least one of the measured values is reached.

3. Method as defined in claim 1, wherein the measuring of the real parameters is repeated continuously for a plurality of the individual connection steps until a preliminary connection configuration is reached and, when the preliminary connection configuration is reached, said generating occurs to produce one of said at least one adjusting parameters.

4. Method as defined in claim 3, wherein said measuring of the real parameters is cyclic.

5. Method as defined in claim 1, wherein said controllable connection device is a controllable screw driver device for turning a screw to make the connection and said real parameters are a torque applied to the screw by the screw driver device and a rotation angle of the screw.

6. Method as defined in claim 5, further comprising determining a change in the torque over a rotation angle interval and deriving a stiffness parameter from the change in the torque divided by the rotation angle interval.

7. Method as defined in claim 5, further comprising determining a change in the rotation angle over a predetermined time interval and deriving a rotation speed as the rotation angle change divided by the predetermined time interval.

8. Method as defined in claim 5, further comprising determining a change in the torque over a rotation angle interval and deriving a stiffness parameter from the change in the torque divided by the rotation angle interval; determining a change in the rotation angle over a predetermined time interval and deriving a rotation speed as the rotation angle change divided by the predetermined time interval; and inputing said rotation speed and said stiffness parameter in said fuzzy-logic means as input variables to determine the controlling output variables.

9. Method of making a connection by means of a controllable screw driver device for turning a screw to make the connection, said method comprising the steps of:
   a) measuring a torque applied to the screw by the screw driver device and a rotation angle of the screw in at least one individual connection step during the making of the connection to obtain measured values of the torque and the rotation angle;
   b) calculating a change in the torque over a rotation angle interval from said measured values and deriving a stiffness parameter from the change in the torque divided by the rotation angle interval;
   c) calculating a change in the rotation angle over a predetermined time interval from said measured values of said rotation angle and deriving a rotation speed as the rotation angle change divided by the predetermined time interval;
   d) analyzing the stiffness parameter and the rotation speed by fuzzy logic means to obtain controlling output variables; and
   e) operating said fuzzy-logic means in one of three operating modes to obtain said controlling output variables from said stiffness parameter and said rotation speed and to produce at least one adjusting parameter for the controllable screw driver device from said controlling output variables, said three operating modes including a low stiffness mode, a normal stiffness mode and a high stiffness mode, so as to control the controllable screw driver device to accurately make the connection.

10. Method of making a connection by means of a controllable screw driver device for turning a screw to make the connection, said method comprising the steps of:

a) measuring a torque applied to the screw by the screw driver device and a rotation angle of the screw in at least one individual connection step during the making of the connection to obtain measured values of the torque and the rotation angle;

b) calculating a change in the torque over a rotation angle interval from said measured values and deriving a stiffness parameter from the change in the torque divided by the rotation angle interval;

c) calculating a change in the rotation angle over a predetermined time interval from said measured values of said rotation angle and deriving a rotation speed as the rotation angle change divided by the predetermined time interval;

d) analyzing the stiffness parameter and the rotation speed by fuzzy logic means to obtain controlling output variables; and e) operating said fuzzy-logic means in one of three operating modes to obtain said controlling output variables from said stiffness parameter and said rotation speed and to produce at least one adjusting parameter for the controllable screw driver device from said controlling output variables, said three operating modes including a low rotation speed mode, a normal rotation speed mode and a high rotation speed mode, so as to control the controllable screw driver device to accurately make the connection.

* * * * *